(12) United States Patent
Shaw et al.

(10) Patent No.: US 7,686,866 B2
(45) Date of Patent: Mar. 30, 2010

(54) RECOVERY OF COPPER FROM CHALCOPYRITE

(75) Inventors: Raymond W. Shaw, New Gisborne (AU); Lucy Esdaile, Carlton (AU); Andrea R. Gerson, Mawson Lakes (AU); Joan E. Thomas, Williamsburg, VA (US); Sarah L. Harmer, Mawson Lakes (AU)

(73) Assignee: Technological Resources PTY Limited, Melbourne (AU)

( * ) Notice: Subject to any disclaimer, the term of this patent is extended or adjusted under 35 U.S.C. 154(b) by 679 days.

(21) Appl. No.: 10/494,051

(22) PCT Filed: Oct. 20, 2002

(86) PCT No.: PCT/AU02/01468

§ 371 (c)(1),
(2), (4) Date: Sep. 24, 2004

(87) PCT Pub. No.: WO03/038137

PCT Pub. Date: May 8, 2003

(65) Prior Publication Data

US 2005/0044990 A1 Mar. 3, 2005

(30) Foreign Application Priority Data

Oct. 29, 2001 (AU) .................................... PR8552

(51) Int. Cl.
C22B 15/00 (2006.01)
(52) U.S. Cl. ........................................................ 75/711
(58) Field of Classification Search .................... 75/711
See application file for complete search history.

(56) References Cited

U.S. PATENT DOCUMENTS

| | | | | |
|---|---|---|---|---|
| 5,429,659 | A * | 7/1995 | Spencer et al. | 75/711 |
| 5,622,615 | A * | 4/1997 | Young et al. | 205/582 |
| 6,277,341 | B1 * | 8/2001 | Pinches et al. | 423/27 |
| 6,746,512 | B1 * | 6/2004 | Shaw | 75/743 |

* cited by examiner

*Primary Examiner*—Roy King
*Assistant Examiner*—Jie Yang
(74) *Attorney, Agent, or Firm*—Miles & Stockbridge

(57) ABSTRACT

A process for recovering copper from chalcopyrite is disclosed. The process includes oxidising sulphur in chalcopyrite with a solution under predetermined contact conditions and thereby releasing at least part of the copper in the chalcopyrite into the solution as copper ions. The process includes a subsequent step of reducing sulphur in a solid product from step (a) to a minus two, ie. sulphide, valence state with a solution under predetermined contact conditions. The process further includes a subsequent step of oxidising sulphur in a solid product from step (b) with a solution under predetermined contact conditions and thereby releasing at least part of the remaining copper in the solid product into the solution as copper ions. The process further includes recovering copper from one or more of the solutions from steps (a) and (c).

24 Claims, 2 Drawing Sheets

RECOVERY OF COPPER FROM CHALCOPYRITE

BACKGROUND OF THE INVENTION

1. Field of the Invention

The present invention relates to the recovery of copper from chalcopyrite ($CuFeS_2$).

The present invention is a process for recovering copper from chalcopyrite that is based on leaching copper into a solution and thereafter recovering copper from the solution.

2. Description of Related Art

There have been a number of proposals to use particular windows of redox potential to leach chalcopyrite.

International application PCT/GB97/00585 (WO98/39491) in the name of Anthony Pinches discloses one such redox-potential window proposal.

The International application discloses a process for leaching copper from chalcopyrite using a solution containing ferric ions and dissolved oxygen to oxidise copper in chalcopyrite into a soluble form.

The process disclosed in the International application is characterised by controlling the surface potential of the chalcopyrite during the leaching step to be within a range of 350 to 450 mV measured against a standard Calomel reference electrode.

The International application discloses that controlling the surface potential within the range of 350 to 450 mV makes it possible to achieve acceptable leaching rates.

SUMMARY OF THE INVENTION

The present invention is based on research work that the applicant believes establishes that the above-described range of 350 to 450 mV is at a borderline between oxidation and reduction conditions.

Having regard to the results of the experimental work the applicant believes that it is possible to achieve better results (in terms of total recovery of copper from chalcopyrite and leaching rates) than those achieved with the process disclosed in the International application.

More specifically, the applicant believes that better results can be achieved with a process in accordance with the present invention that includes treating chalcopyrite firstly under oxidation conditions and then under reduction conditions.

In this process, as with the process disclosed in the International application, copper in the chalcopyrite is released into solution in the oxidation stage.

The purpose of the reduction stage, as currently understood by the applicant, is to reduce sulphur ($S_n^{2-}$) in the remaining solid product to the minus two ie. sulphide ($S^{2-}$) valence state. The applicant believes that this reduction of sulphur ions to the sulphide valence state is necessary to achieve thereafter substantially complete removal of copper in the remaining solid product in a subsequent oxidation stage or cycle of oxidation/reduction stages.

In broad terms, according to the present invention there is provided a process for recovering copper from chalcopyrite that includes the steps of:

(a) contacting chalcopyrite with a solution under predetermined contact conditions, the solution and the contact conditions being selected to oxidise sulphur in the chalcopyrite, and thereby release at least part of the copper in the chalcopyrite into the solution as copper ions;

(b) contacting a solid product from step (a) with a solution under predetermined contact conditions, the solution and the contact conditions being selected to reduce sulphur in the solid product to a minus two, ie. sulphide, valence state, and thereby reduce sulphur in the solid product to sulphide ions;

(c) contacting a solid product from step (b) with a solution under predetermined contact conditions, the solution and the contact conditions being selected to oxidise sulphur in the solid product, and thereby release at least part of the remaining copper in the solid product into the solution as copper ions; and (d) recovering copper from one or more of the solutions from steps (a) and (c).

The above-described leaching process may be carried out as a heap leaching process, a dump leaching process, a reactor leach system, or an in situ leaching process.

Preferably oxidation step (a) includes contacting the chalcopyrite with a solution containing ferric ions.

Preferably oxidation step (a) includes contacting the chalcopyrite with a solution containing ferric ions and dissolved oxygen.

Oxidation of chalcopyrite with ferric ions and dissolved oxygen consumes and converts ferric ions to ferrous ions.

Accordingly, preferably oxidation step (a) includes contacting the chalcopyrite with the solution containing ferric ions and dissolved oxygen in the presence of iron oxidising bacteria that oxidise ferrous ions to ferric ions under aerobic conditions.

Preferably the solution containing ferric ions and dissolved oxygen is at a pH of less than 2.5, more preferably in the range 0.5-2, more preferably in the range of 0.5-1.5.

Preferably the solution containing ferric ions and dissolved oxygen is at a temperature of 30-80° C., more preferably 50-80° C.

Typically, the solution contains sulphate ions, with acidity of the solution being provided as sulphuric acid.

The solution can be sourced externally and/or generated through oxidation of sulphur to sulphate using bacteria.

In an alternative arrangement the solution contains chloride ions, with acidity of the solution being provided as hydrochloric acid.

Selected additives may be added to the solution to assist the leach reactions.

The applicant believes that in some situations improving the stability of cuprous ions in the solution can be beneficial.

When the solution contains sulphate ions, preferably the additives include chloride ions and/or other species which complex with copper ions.

Preferably reduction step (b) includes contacting the solid product from step (a) with a solution containing sulphate ions in the presence of bacteria that consume sulphate ions and generate reagents that reduce sulphur ions in the solid product to sulphide ions under anaerobic conditions.

Preferably this solution contains some iron present as ferrous ions and suitable bacteria such that under the anaerobic conditions ferric ions present in the solution or formed during this stage are reduced to ferrous ions.

Preferably the bacteria are compatible with those used in oxidation step (a) to minimise issues of competition when changing solutions.

More preferably the bacteria are of a type which can change behaviour from oxidising ferrous ions when oxygen is present to reducing ferric ions when oxygen is excluded and can thus be used for both steps (a) and (b).

Preferably oxidation step (c) includes contacting the solid product from step (b) with a solution containing ferric ions and dissolved oxygen.

Preferably oxidation step (c) includes contacting the solid product from step (b) with a solution containing ferric ions and dissolved oxygen in the presence of iron oxidising bacteria that oxidise ferrous ions to ferric ions under aerobic conditions.

In one embodiment, recovery step (d) includes a solvent extraction stage that separates copper ions from solutions containing copper ions and produces copper-containing solvents and copper-depleted raffinates.

With this embodiment, preferably recovery step (d) further includes an electrowinning stage that recovers copper from the solvents.

Preferably also, recovery step (d) includes treating the copper-depleted raffinates and reforming the desired leach liquor by either regenerating any residual ferrous ions to ferric ions in the raffinates or alternatively reduction of ferric ions present to ferrous ions for recycle to the reducing leach stage.

The treated raffinates may be supplied as the solutions for step (a) and/or step (b) and/or step (c).

In another, although not the only other, embodiment recovery step (d) includes treating the solutions containing copper ions and producing a copper-containing intermediate product.

Copper sulphide and copper oxide are examples of the intermediate product.

According to the present invention there is provided a process, such as a heap leaching process, for recovering copper from chalcopyrite that includes the steps of:
  (a) contacting chalcopyrite with a solution containing ferric ions under aerobic conditions in the presence of iron oxidising bacteria and oxidising sulphur in the chalcopyrite and oxidising ferrous ions produced in sulphur oxidation to ferric ions, and thereby releasing at least part of the copper in the chalcopyrite into the solution as copper ions;
  (b) contacting a solid product from step (a) with a solution containing sulphate ions in the presence of bacteria that consume sulphate ions under anaerobic conditions and generating reagents that reduce sulphur in the solid product to a minus two, ie. sulphide, valence state, and thereby reducing sulphur in the solid product to sulphide ions;
  (c) repeating step (a) on the solid product from step (b) and oxidising sulphur in the solid product and oxidising ferrous ions produced in sulphur oxidation to ferric ions, and thereby releasing at least a part of the copper in the solid product into the solution as copper ions; and
  (d) recovering copper from one or more of the solutions from steps (a) and (c).

Preferably the process includes repeating the sequence of steps (a), (b), and (c) in the preceding paragraph and recovering copper from any one or more of the solutions from steps (a) and (c) as required to recover a substantial part of the copper in the chalcopyrite.

Preferably step (b) includes contacting the solid product from step (a) with a solution containing sulphate ions by adding the solution prepared ex situ from the heap and displacing the oxidising solution from step (a) or changing the conditions in the heap such that the solution present is converted to the required reducing solution by limiting the amount of oxygen present and allowing suitable bacterial action to convert the ferric ions to ferrous ions and consume some or all of the sulphate ions, or by both displacement and conversion.

The present invention is based on research work that has resulted in the applicant concluding that the reaction mechanism for leaching copper from chalcopyrite requires a reduction stage following an initial oxidisation stage in order to condition the chalcopyrite, and more particularly sulphur in the chalcopyrite, so that a subsequent oxidation stage can remove substantially all of the remaining copper from the chalcopyrite.

The following dot points summarise the research work carried by and for the applicant and some of the results of the work that resulted in the development of the reaction mechanism.

Dissolution studies at pH 1 and 2, in $HClO_4$ and $H_2SO_4$ at 85° C. and 40° C. (time resolved).
  The dissolution studies were done under air, oxygen or nitrogen to control the amount of possible oxidation.
  The addition of ferric ions was investigated under air and under nitrogen.
  The addition of ferrous ions together with nitrogen purging was investigated—this work showed that if a reductant was initially present then dissolution could be initiated, with the ferric ions produced acting, in turn, as an oxidant.
  XPS surface analysis of surfaces extracted at selected dissolution times—this work showed the development of polysulfide on surfaces and the reemergence of a sulfide peak.
  Solution speciation calculations and quantum-chemical modelling of the surface leach mechanism.

DETAILED DESCRIPTION OF THE PREFERRED EMBODIMENTS

The reaction mechanism for (bulk) chalcopyrite leaching is shown schematically in FIG. 1 and is described stoichiometrically in Equations 1 to 4 below.

Figure 1:
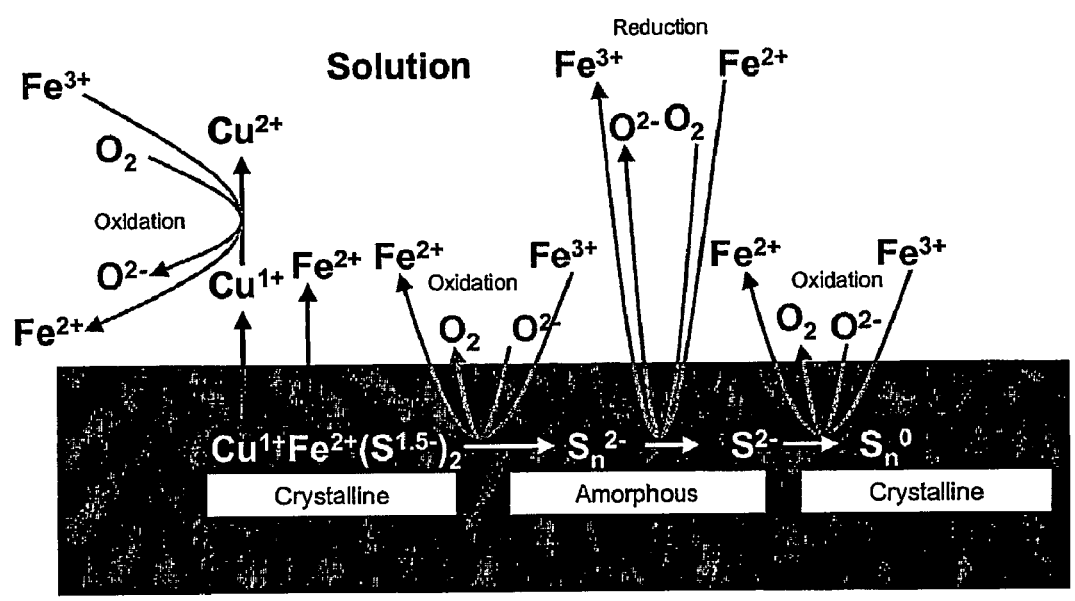
FIG. 1 is a substantially schematic illustration of the reaction mechanism for (bulk) chalcopyrite leaching.

With reference to FIG. 1, the initial reaction in the reaction mechanism is an oxidation reaction for sulphur in chalcopyrite. Equations 1 and 2 are the initial oxidation reaction. In the following equations "n" is an integer greater than 1.

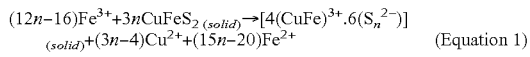
(Equation 1)

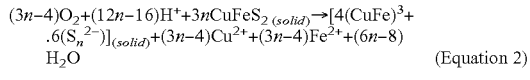
(Equation 2)

The oxidation reaction is shown as $Cu^{1+}Fe^{2+}(S^{1.5-})_2 \rightarrow S_n^{2-}$ in FIG. 1.

Equations 1 and 2 show the initial partial leaching of $Cu^{2+}$ and $Fe^{2+}$ and the formation of polysulfides ($S_n^{2-}$).

The oxidation states of Cu and Fe within chalcopyrite are $Cu^{1+}$ and $Fe^{2+}$ (as shown by quantum-chemical modelling) and retain these oxidation states on formation of polysulfide (as indicated by XPS studies). The oxidation of the sulphur in the chalcopyrite is due therefore to the reduction of a solution species.

The two solution species most likely to be responsible for this process are $Fe^{3+}$ (Equation 1) or $O_2$ (Equation 2).

It appears from the experimental results that $Fe^{3+}$ is a more effective oxidant than $O_2$ as the rate of oxidation increases on addition of $Fe^{3+}$ but, on the increased supply of $O_2$, $Fe^{3+}$ may initially be supplied (in the absence of addition of $Fe^{3+}$) by dissolution of the Fe(III) oxide/hydroxide chalcopyrite overlayer. It is believed this oxidation reaction is rate determining at pH 2 (due to the lower Eh and hence lower ratio of $Fe^{3+}$ to $Fe^{2+}$).

It can be seen from Equations 1 and 2 that the % Cu and Fe leached from the chalcopyrite is a function of the length of the polysulfide chains formed, n. If n=2, ⅓ of the Cu and Fe is leached. However, if n=10 then approximately 87% of the Cu and Fe will be leached during this step. On the basis of these equations it can be postulated that, if there is a sufficiently strong oxidant (such as $Fe^{3+}$) present in sufficient quantities, the leach may proceed to near completion.

With further reference to FIG. 1, the next reaction in the reaction mechanism is a reduction reaction that converts polysulfides ($S_n^{2-}$) to monosulfides ($S^{2-}$).

The reaction is shown in Equation 3.

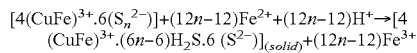

and/or

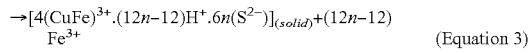
(Equation 3)

The equation represents the reductive breakdown of long chain polysulfides into shorter chain polysulfides. The monosulfide, $S^{2-}$ has been chosen in the equation to represent this process as it is this sulfide that shows the greatest re-emergence on leaching. This reaction is driven by the oxidation of $Fe^{2+}$ to $Fe^{3+}$ or the oxidation of Cu+ to $Cu^{2+}$.

The oxidation of $Fe^{2+}$ to $Fe^{3+}$ will only happen if $Fe^{2+}$ is comparatively in considerable excess in solution. $H^+$ is adsorbed from solution in order to balance the resulting surface charge. Two alternatives for the resulting leached chalcopyrite structure are given in Equation 3 to demonstrate the possible formation of a mixture of monosulfide product and $H_2S$.

The reduction of the polysulfide layer does not allow release of Cu and Fe from the solid but does enable a final oxidation reaction in the reaction mechanism (as shown in FIG. 1) that forms crystalline elemental sulfur.

Equation 4 is the oxidation reaction.

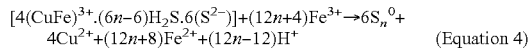
(Equation 4)

The oxidation reaction involves a massive structural rearrangement of the surface from an amorphous polysulfide layer (consisting of what may imaginatively be thought of strands of different length noodles) to crystallites of elemental sulfur (analogous to an enormous honeycomb).

The remaining copper and iron can be leached from the chalcopyrite via the oxidation reaction mechanism. If n=2 then the remaining ⅔ Cu and Fe will be leached during this process. If n=10 then there only remains 13% of Cu and Fe to be leached. It is assumed that all $H^+$ returns to solution. However, this would only occur if all S was converted to crystalline elemental S and therefore this is not likely to be the case. This step does not appear to be rate determining for pH 1 and has not been seen to occur (as yet) for pH 2.

Figure 2:
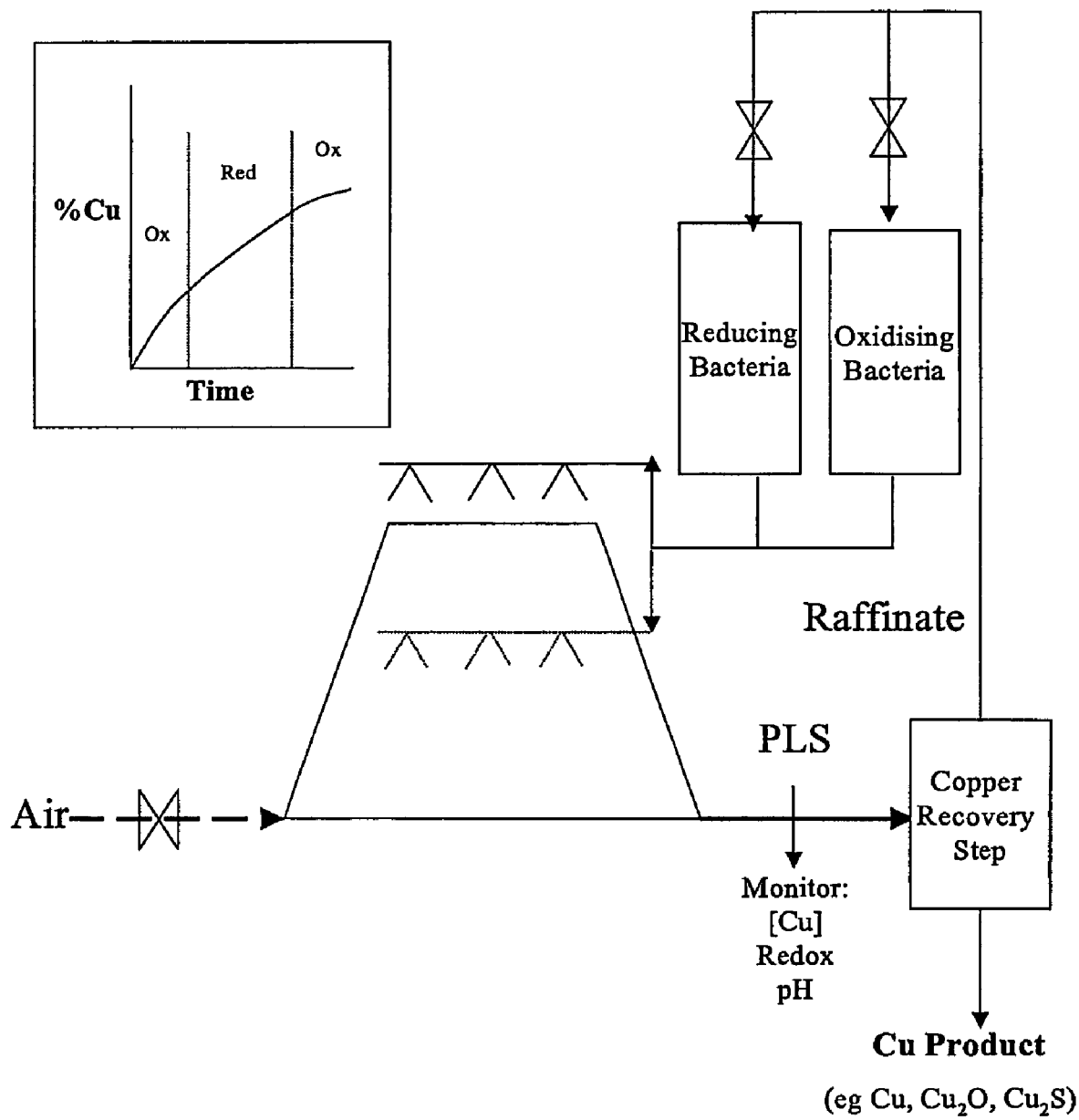
FIG. 2 is an illustration of one preferred embodiment of the process of the present invention.

The process of the present invention is described further by way of example with reference to FIG. 2.

FIG. 2 illustrates one embodiment of the process of the invention.

The process shown in FIG. 2 is a heap leaching process in which a covered heap of chalcopyrite is successively leached by:

(a) a solution containing ferric ions at a pH in the range of 1-2 and a temperature of 60-80° C. and iron oxidising bacteria to oxidise sulphur in the chalcopyrite and convert ferrous ions produced in sulphur oxidation to ferric ions under aerobic conditions; and (b) a solution containing sulphate ions and iron predominantly in the ferrous state with bacteria present that reduce ferric ions to ferrous ions and consume sulphate ions and generate reagents that reduce sulphur ions in the chalcopyrite under anaerobic conditions.

The above leach steps are repeated as required to remove copper from the chalcopyrite. In this context, as is indicated above, reduction leach step (b) makes it possible to remove copper in the chalcopyrite in a subsequent oxidation leach step that was not removed in a preceding oxidation leach step.

Air is supplied selectively to the heap during leach step (a) above via a valve-controlled line or any other suitable means.

The leach solutions are supplied to the heap from storage tanks and are distributed on the heap via arrays of spray nozzles or any other suitable means.

Liquid is removed from the base of the heap and is transferred to a copper recovery treatment stage of the process.

The copper is removed from the liquid and the copper-depleted liquid is recycled to the storage tanks and is re-used in the process.

Depending on the recovery treatment used, the copper is recovered in a range of forms, such as copper, cuprous oxide, and copper sulphide.

It can be advantageous to facilitate control of the flow and temperature of the leach solutions.

In the simplest form as described above (and as is currently practiced for copper oxide and chalcocite leaching) the heap would be sprayed with liquor on the top surface and this is collected at the base. However, this allows only limited control of conditions within the heap and in many cases more complex arrangements are desirable within the heap to control liquor flow and air ingress.

One more complex arrangement includes the incorporation of permeable and barrier zones within the heap. Adding permeable zones within the heap, normally through providing sections of closely sized reasonably coarse material, enables much more uniform conditions to be achieved within the heap. These zones allow redistribution of the liquor internally, and also when desired can allow liquor and/or air injection and liquor removal tangentially from the heap at one or more points down the sides. This can avoid issues of lack of reactivity in the bottom sections of the heap, and unwanted/uncontrolled precipitation occurring, especially of iron compounds, in these lower sections due to concentration and temperature gradients.

Another more complex arrangement includes forming a barrier on the outside of the heap, through either the use of an impermeable cover or through incorporating a material which reacts with the acid liquor to become impermeable. In both instances, the objective is to prevent unwanted air ingress and to make it possible for the heap to be flooded with liquor to facilitate the anaerobic reduction stage. Moreover, these systems can also make possible periodic bottom irrigation to reverse the normal concentration gradients formed during conventional top spraying.

Many modifications may be made to the present invention as described above without departing from the spirit and scope of the invention.

By way of example, whilst the embodiment of the process of the invention described above in relation to FIG. 2 is a heap leaching process, the invention is not so limited and extends to other types of leaching including dump leaching, in situ leaching, and reactor leaching.

What is claimed is:

1. A process for recovering copper from chalcopyrite comprising the steps of:
   (a) contacting chalcopyrite with a solution containing ferric ions to cause oxidation of sulphur in the chalcopyrite, and thereby the release of part of the copper present in the chalcopyrite into the solution as copper ions, the rest of the copper being present in a remaining solid product;
   (b) contacting said solid product from step (a) with a solution containing ferrous ions to cause reduction of sulphur in the solid product to a minus two valence state, i.e., sulphide, and thereby the reduction of sulphur in the solid product to sulphide ions;
   (c) contacting a solid product containing the sulphide ions from step (b) with a solution containing ferric ions to cause oxidation of sulphur in the solid product, and thereby the release of at least part of the copper remaining in the solid product into the solution as copper ions; and
   (d) recovering copper from one or more of the solutions from steps (a) and (c).

2. The process defined in claim 1 wherein the oxidation step (a) includes contacting the chalcopyrite with a solution containing ferric ions and dissolved oxygen.

3. The process defined in claim 2 wherein the oxidation step (a) includes contacting the chalcopyrite with the solution containing ferric ions and dissolved oxygen in the presence of iron oxidizing bacteria that oxidize ferrous ions to ferric ions under aerobic conditions.

4. The process defined in claim 3 wherein the reduction step (b) includes contacting the solid product from step (a) with a solution containing sulphate ions in the presence of bacteria that consume sulphate ions and generate reagents that reduce sulphur in the solid product to sulphide ions under anaerobic conditions.

5. The process defined in claim 4 wherein the solution contains some iron present as ferrous ions and suitable bacteria such that under the anaerobic conditions ferric ions present in the solution or formed during this stage are reduced to ferrous ions.

6. The process defined in claim 5 wherein the bacteria are compatible with the solution used in oxidation step (a) to minimize issues of competition when changing solutions.

7. The process defined in claim 6 wherein the bacteria are of a type which can change behavior from oxidizing ferrous ions when oxygen is present to reducing ferric ions when oxygen is excluded and can thus be used for both steps.

8. The process defined in claim 2 wherein the solution containing ferric ions and dissolved oxygen is at a pH of less than 2.5.

9. The process defined in claim 8 wherein the pH of the solution containing ferric ions and dissolved oxygen is 0.5-2.

10. The process defined in claim 2 wherein the solution containing ferric ions and dissolved oxygen is at a temperature of 30-80° C.

11. The process defined in claim 10 wherein the solution containing ferric ions and dissolved oxygen is at a temperature of 50-80° C.

12. The process defined in claim 2 wherein the solution containing ferric ions and dissolved oxygen also contains sulphate ions, with acidity of the solution being provided as sulphuric acid.

13. The process defined in claim 2 wherein the solution containing ferric ions and dissolved oxygen also contains chloride ions, with acidity of the solution being provided as hydrochloric acid.

14. The process defined in claim 1 wherein the oxidation step (c) includes contacting the solid product from step (b) with a solution containing ferric ions and dissolved oxygen.

15. The process defined in claim 14 wherein the oxidation step (c) includes contacting the solid product from step (b) with a solution containing ferric ions and dissolved oxygen in the presence of iron oxidizing bacteria that oxidize ferrous ions to ferric ions under aerobic conditions.

16. The process defined in claim 1 wherein the recovery step (d) includes a solvent extraction stage that separates copper ions from solutions containing copper ions and produces copper-containing solvents and copper-depleted raffinates.

17. The process defined in claim 16 wherein the recovery step (d) further includes an electrowinning stage that recovers copper from the solvents.

18. The process defined in claim 16 wherein the recovery step (d) includes treating the copper-depleted raffinates and reforming the desired leach liquor by either regenerating any residual ferrous ions to ferric ions in the raffinates or alternatively reduction of ferric ions present to ferrous ions for recycle to the reducing leach stage.

19. The process defined in claim 1 wherein the recovery step (d) includes treating the solutions containing copper ions and producing a copper-containing intermediate product.

20. The process defined in claim 19 wherein the intermediate product is any one or more of cuprous oxide, copper sulphide, and copper oxide.

21. The process defined in claim 19 including repeating the sequence of steps (a), (b), and (c) and recovering copper from any one or more of the solutions from steps (a) and (c) as required to recover a substantial part of the copper in the chalcopyrite.

22. The process defined in claim 1 wherein the reduction step (b) includes contacting the solid product from step (a) with a solution containing sulphate ions in the presence of bacteria that consume sulphate ions and generate reagents that reduce sulphur in the solid product to sulphide ions under anaerobic conditions.

23. A heap leaching process for recovering copper from chalcopyrite, comprising the steps of:
   (a) contacting chalcopyrite with a solution containing ferric ions under aerobic conditions in the presence of iron oxidizing bacteria and oxidizing sulphur in the chalcopyrite and oxidizing ferrous ions produced in sulphur oxidation to ferric ions, and thereby releasing part of the copper in the chalcopyrite into the solution as copper ions, the rest of the copper being present in a remaining solid product;
   (b) contacting said solid product from step (a) with a solution containing sulphate ions under anaerobic conditions in the presence of bacteria that consume sulphate ions and generate reagents that reduce sulphur in the solid product to a minus two valence state, i.e., sulphide, and thereby reducing sulphur in the solid product to sulphide ions;
   (c) repeating step (a) on a solid product containing the sulphide ions from step (b) and oxidizing sulphur in the solid product and oxidizing ferrous ions produced in sulphur oxidation to ferric ions, and thereby releasing at least a part of the copper in the solid product into the solution as copper ions; and
   (d) recovering copper from one or more of the solutions from steps (a) and (c).

24. The process defined in claim 23 wherein step (b) includes contacting the solid product from step (a) with a solution containing sulphate ions by adding a suitable solution prepared ex situ from the heap and displacing the oxidizing solution from step (a) or changing the conditions in the heap such that the solution present is converted to the required reducing solution by limiting the amount of oxygen present and allowing suitable bacterial action to convert the ferric ions to ferrous ions and consume some or all of the sulphate ions, or by both displacement and conversion.

* * * * *